United States Patent
Lovison et al.

(10) Patent No.: US 12,526,671 B2
(45) Date of Patent: Jan. 13, 2026

(54) REALTIME TELEMETRY QUALITY TRACKING AND PROFILING TO PREVENT ERRONEOUS RADIO RESOURCES MANAGEMENT (RRM) COMPUTATION

(71) Applicant: Cisco Technology, Inc., San Jose, CA (US)

(72) Inventors: Federico Lovison, Fontanelle (IT); Sukrit Dasgupta, Norfolk, MA (US); Mohit Dubey, Amsterdam (NL)

(73) Assignee: Cisco Technology, Inc., San Jose, CA (US)

( * ) Notice: Subject to any disclaimer, the term of this patent is extended or adjusted under 35 U.S.C. 154(b) by 441 days.

(21) Appl. No.: 18/310,592

(22) Filed: May 2, 2023

(65) Prior Publication Data

US 2024/0373264 A1   Nov. 7, 2024

(51) Int. Cl.
| | | |
|---|---|---|
| *H04L 12/00* | (2006.01) | |
| *H04L 41/0631* | (2022.01) | |
| *H04L 41/16* | (2022.01) | |
| *H04L 41/5009* | (2022.01) | |
| *H04W 24/08* | (2009.01) | |

(52) U.S. Cl.
CPC ......... *H04W 24/08* (2013.01); *H04L 41/0631* (2013.01); *H04L 41/16* (2013.01); *H04L 41/5009* (2013.01)

(58) Field of Classification Search
CPC ..... H04W 24/08; H04W 24/02; H04W 24/04; H04W 28/0231; H04L 41/0631; H04L 41/16; H04L 41/5009; G06N 20/00
USPC ....................................................... 370/252
See application file for complete search history.

(56) References Cited

U.S. PATENT DOCUMENTS

| | | | |
|---|---|---|---|
| 2019/0281077 A1 | 9/2019 | Deb et al. | |
| 2021/0158106 A1* | 5/2021 | Vasseur | ................. G06N 20/00 |
| 2021/0168657 A1* | 6/2021 | Potharaju | .......... H04W 28/0231 |
| 2021/0297876 A1 | 9/2021 | Bellamkonda et al. | |
| 2021/0352508 A1 | 11/2021 | Azarfar et al. | |
| 2022/0329522 A1* | 10/2022 | Maciocco | ............... H04L 41/16 |
| 2023/0010406 A1 | 1/2023 | Doshi et al. | |
| 2024/0224075 A1* | 7/2024 | Lin | ....................... H04W 24/02 |

FOREIGN PATENT DOCUMENTS

| | | | | |
|---|---|---|---|---|
| CN | 118283654 A | * | 7/2024 | ............ H04W 24/04 |
| WO | 2020249017 | | 12/2020 | |
| WO | WO-2024040586 A1 | * | 2/2024 | ............. H04L 27/00 |

\* cited by examiner

*Primary Examiner* — Frantz Coby
(74) *Attorney, Agent, or Firm* — Polsinelli P.C.

(57) ABSTRACT

A system and method are provided for tracking the quality of telemetry data in a wireless network, and to provide profiling of the telemetry to prevent erroneous radio resource management (RRM) computations. Statistical profiles are generated from the telemetry data that includes both computation data, which is used in RRM computations, and other network data. A data-quality score is generated based on the other data and statistical profiles of the computation data. The data-quality score represents whether the telemetry data is of sufficient quality to be used in RRM computations. The data-quality score can be based, at least in part, on detecting changes in the statistical profiles relative to a baseline statistical profile of the telemetry data and using the second network data to assess a likelihood that the detected changes arise from a degradation in a quality of the first network data.

20 Claims, 7 Drawing Sheets

REALTIME TELEMETRY QUALITY TRACKING AND PROFILING TO PREVENT ERRONEOUS RADIO RESOURCES MANAGEMENT (RRM) COMPUTATION

BACKGROUND

Wireless connectivity is quickly becoming ubiquitous in the modern world, and Wi-Fi is responsible for a significant part of this increase in wireless connectivity. Wi-Fi is one of the fastest growing wireless technologies of all time. With the proliferation of wireless devices and the growth of the internet of things (IOT), there is increasing demand for more bandwidth and wireless rescores. Wireless spectrum is becoming even more precious than before, and the pressure on available spectrum seems likely to only increase over time. Because wireless spectrum is a limited commodity, there is increasing pressure to use the wireless spectrum efficiently.

Radio resource management (RRM) provides tools to better manage a wireless network. When two cells associated with access points (APs) of a wireless network overlap one another on the same channel, they share the spectrum normally reserved for each. In addition to the fact that users of each cell share the single channel of available spectrum, the spectrum is further constrained due to the doubling of the management traffic on the spectrum. This co-channel interference results in higher consumption of air time and less throughput. RRM attempts to improve the network performance by adjusting the channel plan to facilitate the maximum separation of one access point (AP) from another, and by adjusting the power levels transmitted by the APs to optimize the size of their effective cells to provide adequate coverage while minimizing conflicting overlaps. The RRM analyzes the existing RF environment, and adjusts each APs' power and channel configurations to help mitigate such things as co-channel interference and signal coverage problems. RRM reduces the need to perform exhaustive site surveys, increases system capacity and provides automated self-healing functionality to compensate for RF dead zones and AP failures.

RRM includes various computations based on network measurements (e.g., telemetry data). But the results of the RRM and the network performance are only as good as the data they are based. It is a common computing and engineering aphorism that "garbage in garbage out," meaning that poor quality input necessarily produces a faulty output. Generally, it is assumed that the network measurements forming the basis for the RRM processes and computations are an accurate representation of the state of the wireless network. But this assumption can be violated, resulting in erroneous RRM computations.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
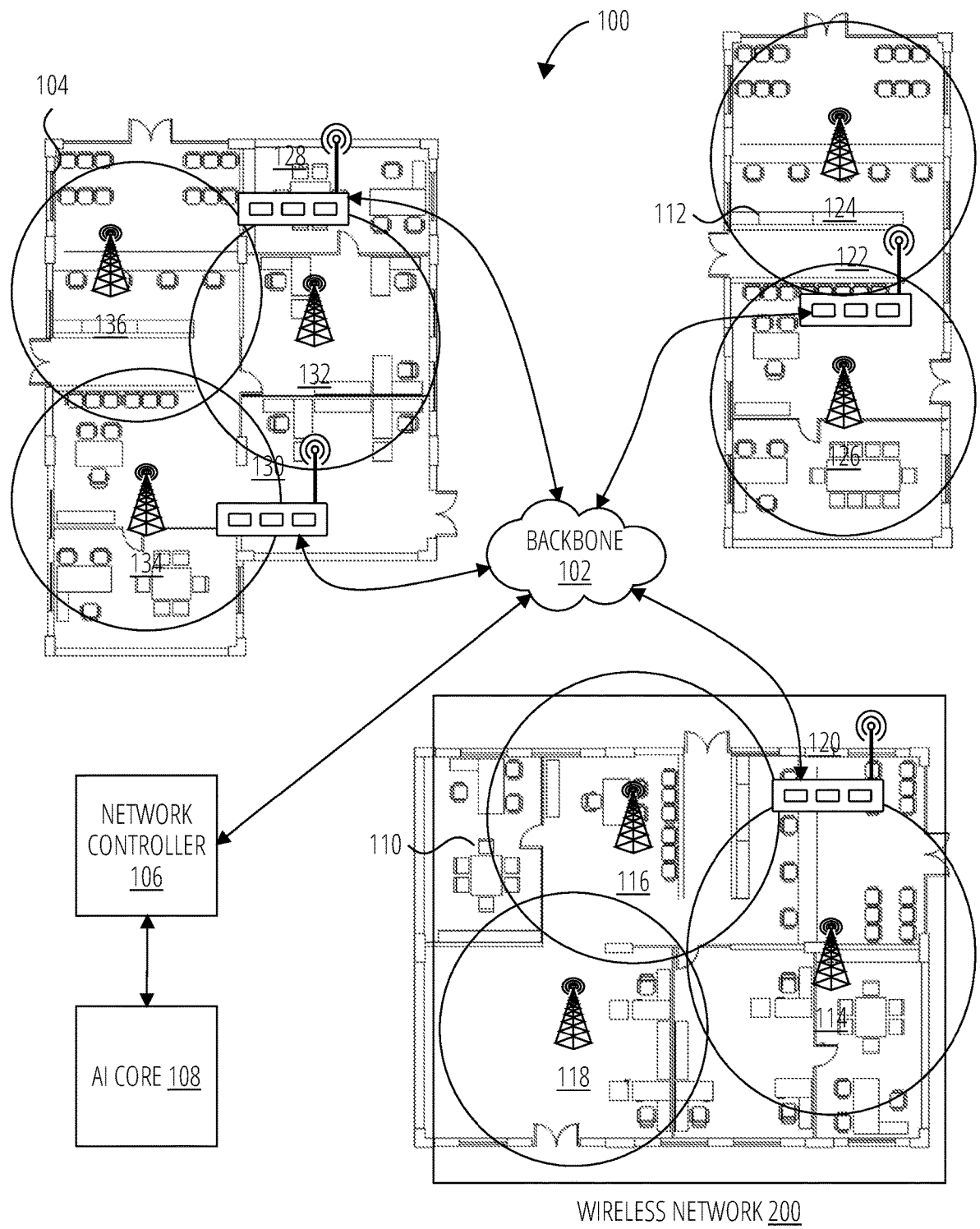
FIG. 1 illustrates a schematic diagram for an example of a system network, in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As stated above, radio resource management (RRM) includes various computations, which are based on telemetry data that is measured throughout the wireless network. When the telemetry data accurately represents the state of the network, the RRM processes can improve the performance of the network, but if the telemetry is bad (i.e., does not accurately represent the state of the network), the RRM based on bad data can adversely impact the network performance.

Additionally, RRM computations can be performed in a cloud-based artificial intelligence (AI)-RRM, for example. The AI-RRM can be used to provide additional improvements beyond those provided by traditional RRM. For example, the AI-RRM can be trained using machine learning (ML) techniques to learn the optimal network configurations for any given set of telemetry data, thereby improving over previous RRM implementations. The AI-RRM can generate configuration recommendations based on processing telemetry data received from the network. The AI-RRM can then transmit these configuration recommendations to the wireless network where they can be implemented by the various network controllers and access points (APs) within the network. These configuration recommendations from the AI-RRM will, however, only be as good as the telemetry data on which they are based.

The methods and apparatuses described herein provide real-time telemetry quality tracking and profiling to prevent erroneous RRM computations. The methods described herein provide several advantages and benefits. For example, continuous profiling and tracking of telemetry quality can ensure that no malicious data is being injected to artificially manipulate and/or disrupt the wireless network. Bad telemetry data can be detected, e.g., based on deviations from a normal/baseline data profile. Consequently, the bad data can be omitted from the RRM computations, rather than pushing potentially erroneous configuration changes on to the wireless network. The methods enable customers to be notified about the bad data.

For example, when a root cause of the bad data can be traced back to software upgrades or configuration changes, customers to be notified to rollback the software upgrades or configuration change. The methods described herein could detect anomalous changes (e.g., statistical deviations) from the normal quality for the data, and then correct for the anomalous changes (e.g., filter the telemetry data or otherwise modify the telemetry data to correct for the offset), thereby generating corrected/filtered data that can be used to continue normal operations the AI-RRM or RRM processes, as though there never were the anomalous changes.

Alternatively, once detected, the bad data could be avoided by using historical data in lieu of the bad data, thereby continuing normal operations. Then, once the issues causing the bad data have been resolved restoring the state of the current incoming telemetry data to be good data, the AI-RRM or RRM processes would continue used the current telemetry data, rather than the historical data.

The RRM computations can be performed in various locations throughout the wireless network. The data-quality score can be provided wherever these RRM computations are being performed to inform the computational process regarding the quality/reliability of the telemetry data. The device performing the computations can then use the data-quality score in one of several ways. For example, the device performing the computation can use the data-quality score to determine whether certain periods of the telemetry data should be used or omitted from the respective RRM computations. Further, the device performing the computation can use the data-quality score to determine how much weight should be given to respective periods of the telemetry data. For example, in certain implementations, even when the data for a given time period is used for the RRM computations, the data-quality score can be used to decrease the relative weight ascribed to time period having lower data-quality scores other time periods corresponding to higher data-quality scores.

As discussed above, the RRM computations can be performed in various locations throughout the wireless network. For example, the AI-RRM can be a cloud-based application, and the AI-RRM can perform various RRM computations. In this case these RRM computations would be performed in the cloud. In contrast, some of the RRM processes are local algorithms (e.g., the coverage hole detection and mitigation algorithms), meaning they are performed at the access-point level of the network. These RRM computations might be performed at the APs, for example. Other RRM processes are global algorithms (e.g., dynamic channel assignment algorithm and the transmit power control algorithm), meaning they are performed at a higher level within the hierarchy of the network architecture, such as at the RF-Group level of the network. These RRM computations might be performed by a wireless controller or a wireless LAN controller, for example. Thus, the RRM computations can be implemented by different devices and at different levels within the hierarchy of the network.

Overview

In one aspect, a method is provided for monitoring quality of telemetry data from a wireless network. The method includes processing, by a statistical profiling layer, telemetry data from a wireless network and generating therefrom statistical profiles of the telemetry data, where the computations and second network data that is not used in the RRM computations. The method further includes applying the statistical profiles together with the second network data to a data-quality model that generates a data-quality score, which is a function of time, the data-quality score representing an assessment of quality for the first network data. The method further includes providing the data-quality score to an RRM calculator that uses the data-quality score when performing RRM computations based on the first network data.

In another aspect, the method may also include that the RRM calculator is an artificial intelligence (AI)-RRM engine that is based in a cloud. The AI-RRM engine uses the telemetry data to generate configuration recommendations for the wireless network.

In another aspect, the method may also include that the data-quality score is based, at least in part, on detecting changes in the statistical profiles relative to a baseline statistical profile of the telemetry data and using the second network data to assess a likelihood that the detected changes arise from a degradation in a quality of the first network data.

In another aspect, the method may also include that the data-quality model that generates the data-quality score is a machine-learning (ML) model that has been trained using training data. The training data includes labeled telemetry data, and the labeled telemetry data includes a label, first training data, and second training data. The first training data is telemetry data that is used in the RRM computations. The second training data is telemetry data that is not used in the RRM computations, and the label is a training data-quality score corresponding to quality of the first training data as a function of time. The ML model is trained by iteratively adjusting parameters of the ML model to generate an output that minimize a loss function representing a difference between the training data-quality score and an output of the ML model generated in response to applying the first training data and the second training data as inputs to the ML model.

In another aspect, when the data-quality score falls below a predefined threshold, signaling that the data quality is poor. The method may also include processing the statistical profiles together with the second network data to predict one or more potential root causes of the poor data quality.

In another aspect, the method may also include signaling, to a user, the one or more potential root causes of the poor data quality by controlling a display to display an image that communicates the one or more potential root causes.

In another aspect, the method may also include that the statistical profiles represents statistical distributions of key performance indicators (KPI) of the first network data, and the data-quality score is based, at least in part, on an analysis of correlations between the KPIs and the second network data, such that the data-quality score remains high when the correlations remain within a baseline range, but the data-quality score decrease as the correlations move farther away from the baseline range.

In another aspect, the method may also include that the statistical profiles represent statistical distributions of key performance indicators (KPI) of the first network data, and the data-quality score is based, at least in part, on a baseline range determined for the statistical distributions of the KPIs. The data-quality score remains high when the statistical profiles remain within the baseline range, but the data-quality score decrease as the statistical profiles deviate farther away from the baseline range.

In another aspect, the method may also include that the statistical profiles represent statistical distributions of key performance indicators (KPI) derived from the first network data, and the data-quality score is based, at least in part, on a degree to which the statistical distributions of the KPIs agree with baseline properties that have been determined for the statistical distributions of the KPIs.

In another aspect, the method may also include filtering or correcting the first network data using the data-quality score to generate filtered or corrected first network data, and providing the filtered or corrected first network data to the RRM calculator.

In another aspect, the method may also include weighting the first network data using the data-quality score to generate weighted first network data, and providing the weighted first network data to the RRM calculator.

In another aspect, the method may also include omitting portions of the first network data from computations performed by the RRM calculator. The portions of the first network data that are omitted from computation correspond to one or more periods during which the data-quality score is below a predefined threshold. The method may also include signaling to a user that the portions of the first network data were omitted from the computations performed by the RRM calculator.

In another aspect, the method may also include that the data-quality score decreases when changes in the statistical profiles correlate or coincide with events in the second network data indicating a likelihood that the changes in the statistical profiles arise from a condition other than a change in a performance of the wireless network.

In another aspect, the method may also include further includes receiving, at the statistical profiling layer and at the data-quality model, feedback from the RRM calculator, and using the feedback from the RRM calculator when generating the statistical profiles and generating the data-quality score.

In another aspect, the method may also include that the feedback from the RRM calculator is used to perform reinforcement learning on the data-quality model. The feedback from the AI-RRM engine provides an indication of which time windows of the telemetry data resulted in the RRM computations that improved a performance of the wireless network and which time windows of the telemetry data resulted in the RRM computations that degraded the performance of the wireless network.

In one aspect, a computing apparatus includes a processor. The computing apparatus also includes a memory storing instructions that, when executed by the processor, configure the apparatus to perform the respective steps of any one of the aspects of the above recited methods.

In one aspect, a computing apparatus includes a processor. The computing apparatus also includes a memory storing instructions that, when executed by the processor, configure the apparatus to process, by a statistical profiling layer, telemetry data from a wireless network and generating therefrom statistical profiles of the telemetry data. The telemetry data includes first network data that is used in radio resource management (RRM) computations and second network data that is not used in the RRM computations. When executed, the stored instructions cause the processor to apply the statistical profiles together with the second network data to a data-quality model that generates a data-quality score, which is a function of time, the data-quality score representing an assessment of quality for the first network data. When executed, the stored instructions cause the processor to provide the data-quality score to an RRM calculator that uses the data-quality score when performing RRM computations based on the first network data.

In another aspect, when executed by the processor, instructions stored in the memory cause the processor to feedback send from the RRM calculator to the data-quality model, and the from the RRM calculator is used to perform reinforcement learn on the data-quality model, where the feedback from the AI-RRM engine provides an indication of which time windows of the telemetry data resulted in the RRM computations that improved a performance of the wireless network and which time windows of the telemetry data resulted in the RRM computations that degraded the performance of the wireless network.

In another aspect, the data-quality model that generates the data-quality score is a machine-learning (ML) model. The ML model has been trained using training data that is labeled telemetry data, and the labeled telemetry data includes a label, first training data, and second training data. The first training data being telemetry data is used in the RRM computations. The second training data is telemetry data that is not used in the RRM computations. The label is a training data-quality score corresponding to quality of the first training data as a function of time. The ML model is trained by iteratively adjusting parameters of the ML model to generate an output that minimize a loss function representing a difference between the training data-quality score and an output of the ML model generated in response to applying the first training data and the second training data as inputs to the ML model.

In another aspect, when executed by the processor, instructions stored in the memory cause the processor to generate the data-quality score such that the data-quality score is based, at least in part, on detecting changes in the statistical profiles relative to a baseline statistical profile of the telemetry data and using the second network data to assess a likelihood that the detected changes arise from a degradation in a quality of the first network data.

In one aspect, a non-transitory computer-readable storage medium, the computer-readable storage medium including instructions that when executed by a computer, cause the computer to perform the respective steps of any one of the aspects of the above recited methods.

In one aspect, a non-transitory computer-readable storage medium, the computer-readable storage medium including instructions that when executed by a computer, cause the computer to process, by a statistical profiling layer, telemetry data from a wireless network and generating therefrom statistical profiles of the telemetry data, where the computations and second network data that is not used in the RRM computations, apply the statistical profiles together with the second network data to a data-quality model that generates a data-quality score, which is a function of time, the data-quality score representing an assessment of quality for the first network data, and provide the data-quality score to an RRM calculator that uses the data-quality score when performing RRM computations based on the first network data.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for preventing erroneous RRM computations by tracking the quality of the telemetry data on which the RRM computations are based. Tracking the quality of the telemetry data can include generating a data-quality score that represents the degree to which the telemetry data can be trusted as an accurate representation of the state of the wireless network. For example, if the telemetry data degrades, the data-quality score can be monitored to determine when the score has fallen below a minimum quality threshold. And when the score has fallen below a minimum quality threshold the corresponding telemetry data is prevented from being used in the RRM computations.

There can be various sources for the telemetry data used in RRM computations. For example, telemetry in typical network environments is a mechanism to stream data from a minimization of drive test (MDT) capable device to a destination. These network environments can use a push model and provide near real-time access to operational statistics for monitoring data. In some instances, a user can subscribe to the data by using standards-based data models over open protocols. Thus, telemetry can be understood as being a subset of monitoring, and telemetry can refer to the mechanism of representing the measurement data provided by a monitoring tool. Advancements in the fields of data science, machine learning (ML), and artificial intelligence (AI) motivate the creation of analytical tools and platforms to enhance the overall operability of various network environment appliances and tools by providing measurement data for analysis.

However, once these tools are implemented to provide the measurement data, oftentimes, a manual configuration and analysis is part of the process used to meet the operational statistics desired for improvements or enhancements of the overall network environment. Further, sometimes RRM algorithms can respond to telemetry that is transient/anomalous, or is otherwise inaccurate, such as network measurements received from a malicious party intending to manipulate or corrupt the network. The methods described herein track the quality of the telemetry data to determine which telemetry data is of sufficiently high quality that it can used in RRM computations and ultimately be acted upon by the wireless network.

Real-time telemetry quality tracking and profiling can assist with preventing erroneous RRM computation. Continuous profiling and tracking of telemetry quality ensures no malicious data is being injected artificially. The real-time quality tracking and profiling can include proactively monitoring metrics such as memory and CPU utilization, Interface counters and interface summary, ISIS route counts and ISIS interfaces, border gateway protocol (BGP) neighbors, path count prefix count, and bandwidth allocation for each interface. The real time metrics can be used to build a baseline/normal data profile.

Based on deviations from the baseline/normal data profile, the methods disclosed herein can detect when the quality of the telemetry data becomes poor and prevent RRM computations from being performed using this bad data. For example, if a bug were included in a software upgrade of the wireless network, and the bug were to somehow corrupt a part of the telemetry data, the methods disclosed herein would prevent the RRM processes from kicking in and pushing potentially erroneous configurations changes on to the wireless network. Further, upon detection of a deviation from the baseline data profile, the system can notify the customer regarding the bad data, and the system can recommend remedial actions to mitigate the problem (e.g., proposing to rollback changes to a previous software version). In the above example of the software upgrade having a bug, the system might identify as the source of the bad data the software upgrade or configuration changes that were made over a period of time or a history of configuration channels that can affect network performance. Based on identifying the software upgrade as a likely source for the bad data, the system might recommend rolling back the software upgrade to a previous non-buggy software version.

In certain examples of the methods disclosed herein, the RRM can correct/filter out the offending aspects of the bad data by determining the statistical deviations of the bad data from the baseline values for good-quality telemetry data, and the methods disclosed herein can use this determined deviations as an offset that is used to correct the bad data, such that the RRM can continue to function properly using the corrected telemetry data. It is noted that deviations from the baseline can include short-term and persistent interference.

Alternatively, the RRM can also use historical data to continue to function until the issue with the bad data has been resolved.

FIG. 1 illustrates an example of a system network 100 that includes three buildings (i.e., building A 104, building B 110, and building C 112). In this nonlimiting example, the building A 104 includes two wireless LAN controllers (WLCs) and three access points (APs). Here, a first RF Group is formed among the wireless LAN controller WLC A1 128 and access points AP A1 132 and AP A3 136. A second RF Group is formed by WLC A2 130 and access points AP A2 134. The building B 110 includes a single RF group: wireless LAN controller WLC B 122 and access points AP B1 124 and AP B2 126. Finally, building C 112 includes wireless network 200, which has a single RF group, which is made up of one wireless LAN controller (i.e., WLC 120) and three access points (AP1 116, AP2 114, and AP3 118). The WLCs can be, e.g., a CISCO WLC such as WLC model numbers 9800, 8500, 7500, 5520, 5760, 5508, 3850, and 2500. The WLCs can transmit and receive signals to and from the backbone 102. For example, communications between the backbone 102 and the WLCs can be performed via a CAPWAP tunnel.

The settings of the WLCs can be controlled by a network controller 106, which communicates with the WLCs via the backbone 102. For example, the network controller 106 can be a CISCO DNA Center, which is a centralized intent-based network management system. The network controller 106 can be based in the cloud, for example. Further an artificial intelligence (AI) core 108 communicates signal to and from the network controller 106. The AI Core 108 can, e.g., signal configuration recommendations, and then some or all of the configuration recommendations can be implemented by the network controller 106, which signals network settings and configurations to the WLCs. The WLCs then apply the configurations and settings to the APs.

For example, the AI Core 108 can receive information such as telemetry data collected on the wireless network 200, and the AI Core 108 processes the received information to generate configuration recommendations for the wireless network 200. The AI Core 108 may be, for example, a cloud based application that learns from the wireless network 200 and from additional wireless networks how best to optimize the network configurations based on data and measured values from the respective networks. The configuration recommendations are then sent from the AI Core 108 to the network controller 106.

The wireless network 200 includes an artificial intelligence (AI) Core 102, a network controller 104, a wireless local area network (LAN) Controller 106, and several access points (APs) (e.g., AP1 116, AP2 114, and AP3 118). Each AP has a surrounding cell in which user devices, such as user equipment 1 (UE1) 114 and user equipment 2 (UE2) 204 can wirelessly communicate with the respective AP of the cell (e.g., cell1 206 surrounds AP1 116; cell2 208 surrounds AP2 114; cell3 210 surrounds AP3 118). As the user device moves from one cell to the next, the user device will change which cell it is communicating with. The wireless network 200 provides wireless communications with one or more wireless devices such as user devices.

A network administrator can interact with the network controller 106 using a graphical user interface (GUI) that enables the network administrator to specify various settings, including, e.g., settings for when to apply configuration recommendations and which of the configuration recommendations to apply at which times and to which parts of the wireless network 200. Then the configuration recommendations can be implemented by the network controller 106 in accordance with the specifications by the network administrator (or other uses).

The wireless LAN controller 120 can communicate with a wide area network (WAN) 206 to allow the user devices to access the internet, for example. The wireless network 200 can be a WiFi network operating in accordance with an IEEE 802.11 protocol.

The AI Core 108 can be used to perform radio resource management (RRM). RRM allows the wireless network 200 to continuously analyze the existing RF environment, and based on this analysis automatically adjust each APs' power and channel configurations to help mitigate such things as co-channel interference and signal coverage problems. RRM can reduce the need to perform exhaustive site surveys, and RRM can increase system capacity and provides automated self-healing functionality to compensate for RF dead zones and AP failures.

The system network with quality tracking 300 comprises a network controller 106, an AI Core 108, a wireless network 302, a cloud 304, a telemetry quality tracker 306. The telemetry quality tracker 306 includes a profiling layer 308, which includes a 1st statistical profiler 322, a 2nd statistical profiler 324, and so forth through an Nth statistical profiler 326, The telemetry quality tracker 306 includes a data-quality model 310, which includes a 1st data model 328, a 2nd data model 330, and so forth through an Nth data model 332. At various points within the system network with quality tracking 300 data is generated, transmitted, received, or otherwise processed. This data can include telemetry data 312, a data-quality score 314, feedback 316, a bad-data notification 318, and computation data 320.

Figure 3:
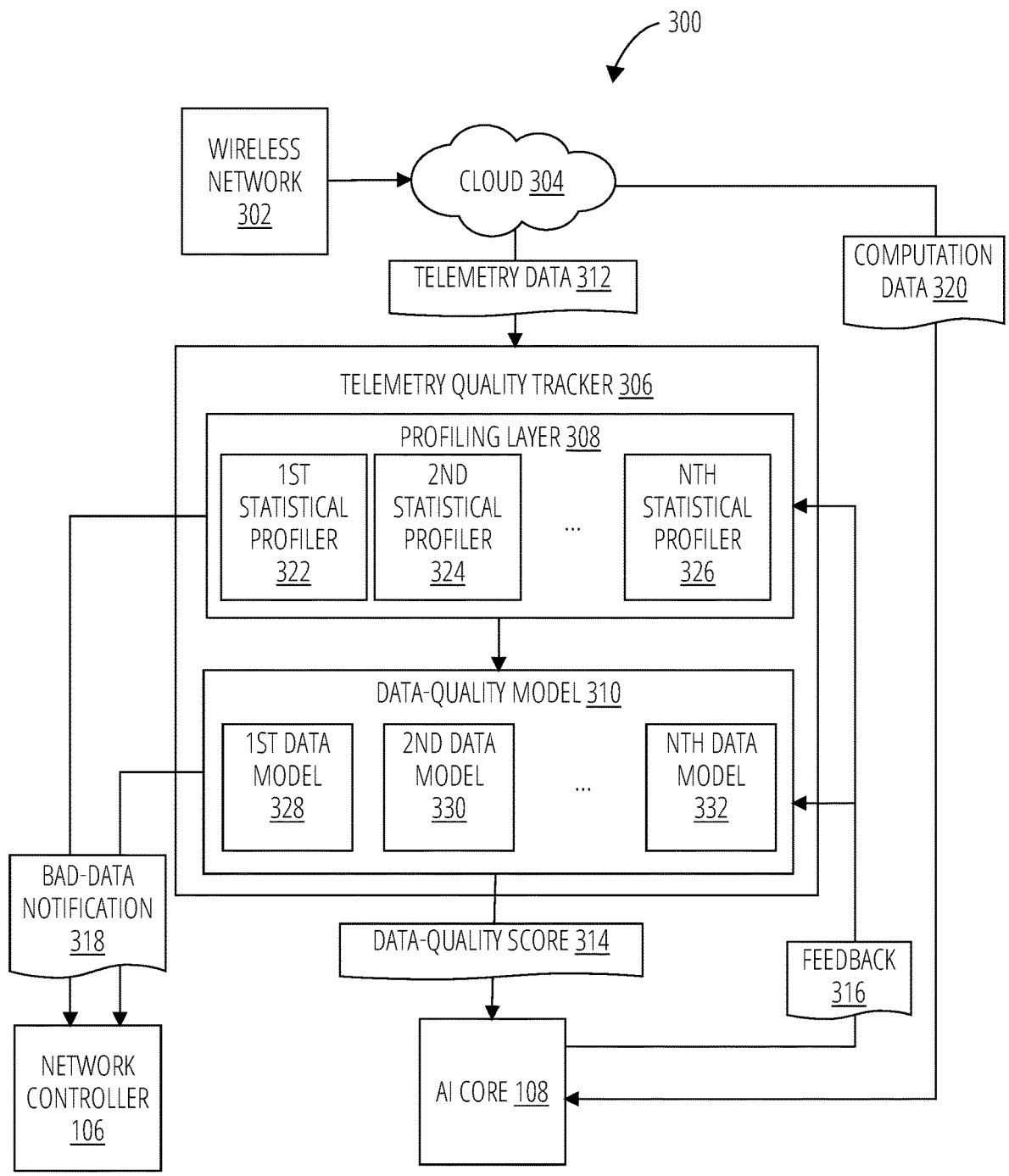
FIG. 3 illustrates a block diagram of an example of a system network with quality tracking, in accordance with some embodiments.

FIG. 3 illustrates a block diagram of a telemetry quality tracker 306 that generates data-quality score 314 based on telemetry data 312. In this non-limiting example, the RRM calculator 334 (e.g., AI Core 108) and the telemetry quality tracker 306 are based in a cloud 304. Without limiting the disclosure to the example in which the RRM calculator 334 is an AI Core 108, FIG. 3 will be described using the non-limiting example in which the RRM calculator 334 is an AI Core 108. A person of ordinary skill in the art will, however, understand that other devices in the system network 100 can perform the RRM computations, and that the RRM computations can be and often are distributed throughout the system network 100. Accordingly, the function of the RRM calculator 334 can be distributed among multiple devices including, e.g., the AI Core 108 the network controllers 106, the wireless LAN controllers 120, etc. For simplicity, the example in which the RRM calculator 334 is an AI Core 108 is discussed herein.

The telemetry data 312 is collected from the wireless network 302 and transmitted to the cloud 304. The wireless network 302 can be, for example, the system network 100 or the wireless network 200. The telemetry data 312 can include various network measurements that are used in radio resource management (RRM) and in various computations performed by the AI Core 108, for example. The telemetry data 312 used in these computations is referred to as computation data 320. In addition to the computation data 320, the telemetry data 312 can include additional data that is not used in the RRM computations or in the various computations performed by the AI Core 108. Examples of additional data can include what software version is operating on the wireless network 302, metadata regarding the APs and UEs in the wireless network 302, and other information that in some way correlates with the computation data 320 or can otherwise be used to corroborate (or discredit) the accuracy of the computation data 320 in representing the state of the wireless network 302. The telemetry quality tracker 306 uses the telemetry data 312 to determine a data-quality score 314.

The data-quality score 314 can be generated by ingesting the telemetry data 312 into the telemetry quality tracker 306 and applying the telemetry data 312 to a profiling layer 308, which can also be referred to as a statistical profiling layer 308. The profiling layer 308 generates statistical profiles for at least part of the telemetry data 312, including, e.g., expectation values, correlations, covariances, variances, and higher-order moments (e.g., skewness, kurtosis, etc.). The statistical profiles are generated, e.g., for various key performance indicators (KPIs) of the computation data 320, using one or more statistical profilers (e.g., 1st statistical profiler 322, 2nd statistical profiler 324, . . . . Nth statistical profiler 326). These statistical profiles can include various indicators that the telemetry data 312 accurately represents the operation and performance of the wireless network 302.

By observing the behavior of good quality data over a period of time, a baseline can be established regarding the statistical profiles of the telemetry data. Later, if the statistical profiles deviate significantly from these baselines, these deviations can indicate a problem with the telemetry data during the period of time of these deviations. Thus, when performing various RRM computations, e.g., the AI Core 108 (or other device performing the RRM computations) may choose to omit the telemetry data from that period of time. This process of establishing a baseline for good data quality and then comparing current data to that baseline to evaluate the quality of the current data is performed by the data-quality model 310, which can include one or more individual data models (e.g., 1st data model 328, 2nd data model 330, . . . . Nth data model 332). In addition to determining the data-quality score based on comparing the statistical profiles to baseline statistical profiles, the data-quality model 310 can also use the additional data in the telemetry data 312 (i.e., other than the computation data 320) to detect anomalies or bad portions in the telemetry data.

For example, a malicious UE may enter or dwell within one or more cells in the wireless network. As part of the process for generating the telemetry data, the wireless network 302 may request measurement information from UEs within the cells of the wireless network 302. The malicious UE may send false measurement information to the wireless network 302 to manipulate or spoof the wireless network 302. If the false measurement information sent from the malicious UE were acted on, the resulting RRM computations would cause the AI Core 108 to make certain potential harmful or degrading configuration recommendations to the wireless network 302. For example, the malicious UE may report to the wireless network false measurement information that includes inaccurate transmit or receive powers or interference values. This false measurement information can be detected by noticing that they are wildly inconsistent with those from neighboring UEs. By comparing the reported values from the malicious UE with those of other UEs, the telemetry quality tracker 306 can determine a high likelihood that some of the telemetry data is anomalous. Further, given a larger number of measurements, the telemetry quality tracker 306 can determine with a reasonable likelihood, which of the measurements are anomalous.

In certain examples of the telemetry quality tracker 306, the anomalous data within the telemetry data 312 can be isolated and corrected or otherwise filtered out of the telemetry data 312, such that the corrected/filtered telemetry data 312 can still be used for RRM computations (e.g., the corrected/filtered telemetry data 312 can be used in the computations by the AI Core 108).

In other examples of the telemetry quality tracker 306, the data-quality score 314 is used to flag time periods during which the anomalous data occurs within the telemetry data 312, and, for these time periods, the telemetry data 312 can be omitted from the RRM computations and from other computations of configuration recommendations by the AI Core 108.

Alternatively or additionally, the data-quality score 314 can be used to generate a weighting value that is used to weight the contributions of the telemetry data 312.

In another example, software versions operating on the wireless networks 302 may be routinely updated. It is possible that a new software version includes a software bug resulting in anomalous values for one or more KPIs or network measurements in the telemetry data 312. The updating of the software version is not part of the computation data 320, but the coincidence of the timing of the update to the software version with the timing of the onset of the anomalous values in the telemetry data 312 is at least suggestive that the anomalous values resulted are related to the updating of the software version. One of the data models in the data-quality model 310 can look for such coincidences between network events and changes in the statistical profiles to determine a likelihood that the changes in the statistical profiles are due to something other than physical or operational changes in the wireless networks 302.

Additionally, changes in the statistical profiles during off hours or when there are none or few UEs connected to the wireless network 302 might also suggest that the changes in the statistical profiles are due to bad data rather than due to an actionable change to the wireless network 302 itself. In each of these cases, the bad data should not be used in RRM computations or in other computations by the AI Core 108 of configuration recommendations.

Bad data can be detected by monitoring if the data-quality score 314 falls below one or more minimum thresholds. For example, multiple thresholds can be used in a tiered system of labeling how poor is the data quality, and an escalating series of steps can be applied if the quality of data becomes increasingly poor or is prolonged for a longer period of time. In the event that bad data is detected in the telemetry data 312, a bad-data notification 318 can be generated by the telemetry quality tracker 306, and the bad-data notification 318 can be sent to the network controller 106, which includes a graphical user interface (GUI) to communicate the issue to a user by displaying in the GUI the information from the bad-data notification 318.

In certain non-limiting example, the telemetry quality tracker 306 predicts potential root causes for the bad data. These potential root causes can be communicated to a user as part of the bad-data notification 318. For example, when the telemetry quality tracker 306 determines a high-likelihood that the changes to the statistical profiles arose out of a new software version that possibly includes a software bug, the bad-data notification 318 can include information suggesting that the new software version is the root cause. The root cause analysis can include, e.g., Shapley Additive explanations (SHAP) values indicating an amount of contributions due to various potential causes.

Additionally or alternatively, root causes for the bad data can be determined using one or more clustering methods. For example, density-based spatial clustering of applications with noise (DBSCAN) can be used to perform statistical analysis on RRM KPIs to tag anomalous radios, group radios with similar characteristics, and to perform comparisons between good and bad APs and/or UEs. Additionally or alternatively, root causes for the bad data can be determined using one or more random forest classifiers or non-linear classifiers that operates on numerical and categorical data representing the possible root cause(s). The root causes for the bad data can be determined using gradient boosted trees methods. Other machine learning methods providing possible explanations for the changes in the statistical profiles can also be used.

As a second example, when the potential root cause is a malicious or anomalous data source (e.g., a malicious UE), the bad-data notification 318 can provide information of the malicious or anomalous data source and any evidence supporting this conclusion regarding the root cause. The bad-data notification 318 can also notify the user regarding possible actions to take and what portions of the telemetry data 312 has been omitted from the computations due to the suspected malicious or anomalous data source. User responses to the bad-data notification 318 (e.g., user inputs confirming or disaffirming that the flagged/omitted data is actually bad data) can be used in the feedback 316.

The data-quality score 314 is communicated to the AI Core 108. In certain non-limiting examples, filtered and/or weighted telemetry data 312 can also be provided from the telemetry quality tracker 306 to the AI Core 108. When filtered and/or weighted telemetry data 312 is not provided m the telemetry quality tracker 306 to the AI Core 108, the computation data 320, which is used in the computations by the AI Core 108, can be received from the cloud 304.

In certain non-limiting example, feedback 316 is provided from the AI Core 108 to the telemetry quality tracker 306. This feedback 316 can be used for reinforcement learning. For example, one or more of the data models can be a machine learning method that is trained on labeled training data in which a label of the data quality has been assigned to a time series of training data. The AI Core 108 can provide additional training data for reinforcement learning based on which telemetry data 312/computation data 320 generates configuration recommendations resulting in the greatest improvements in network performance versus those time periods of data that result in degradations in performance.

Figure 4:
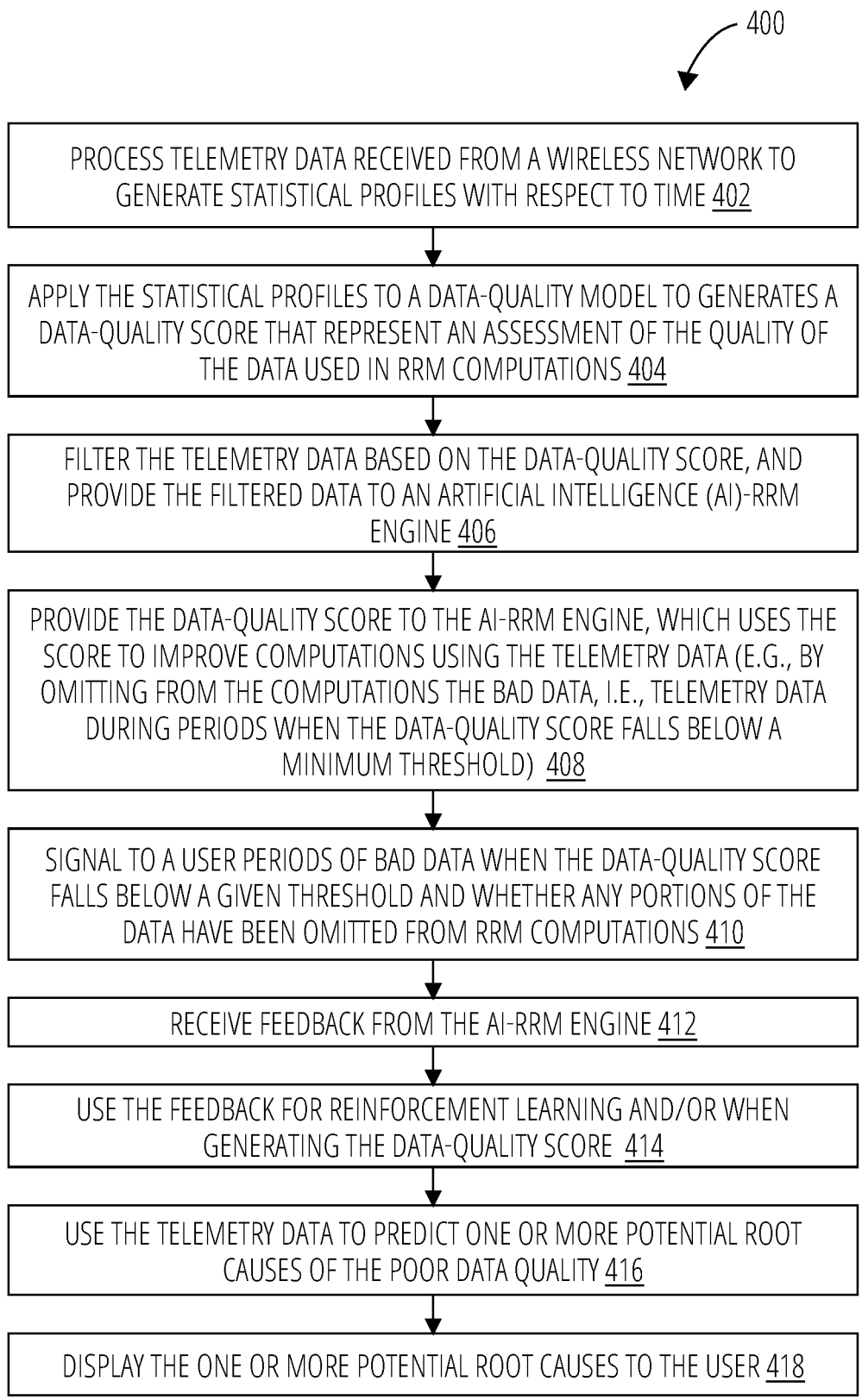
FIG. 4 illustrates a flow diagram of an example of a method 400, in accordance with some embodiments.

FIG. 4 illustrates a method of tracking data quality for telemetry data 312.

In block 402 of method 400, the telemetry data 312, which is received from a wireless network 302 is processed by the statistical profiling layer 308 to generate statistical profiles of the telemetry data 312. The statistical profiles of the telemetry data 312 can be a function time, and the telemetry data 312 can includes first network data (i.e., computation data 320), which is used in radio resource management (RRM) computations or in other computations by the AI Core 108, and the telemetry data 312 can include second network data that is not used in any of the computations. The statistical profiles can be for network measurements and KPIs used in the RRM computations. Examples of KPIs can include: RSSI values, co-channel interference, SNR values, SNIR values, CM values, channel utilization, and any of the measured values used to determine these values. Additional examples of KPIs can include values related to radio utilization (traffic), such as: number of neighbor APs, RSSI for neighbors, distance of neighbors (e.g., when forward table manager (FTM) functionality is supported), and non-WiFi interferer data (e.g., data can include information regarding which channel are affected, the duty-cycle of the interference, and interferer type).

The second network data can include non-computational information about the wireless network, such as a log of the software and firmware upgrades/changes, a log of network configuration changes, the number of clients and UEs in various cells, as well as the total number of clients and UEs in RF groups and/or RF neighborhoods.

Additional network-related, non-computational information can include: client statistics, distribution and variations in the client count as a function of day/time, distribution of client types and capabilities, radio interface traffic statistics (e.g., distributions of the data rates, data-rates retransmissions, and/or packet drops and distributions thereof). Additionally or alternatively, the network-related, non-computational information can further include data regarding applications, including quantitative-applications data and/or qualitative-application data. The quantitative-applications data can include, e.g., a list(s) of applications in use and throughput of the applications (e.g., the total throughput, the throughput by respective applications, the throughput by application groups, and/or the throughput by QoS queues). The qualitative-application data can include, e.g., latency, jitter, and/or packet loss.

In block 404 of method 400, the statistical profiles together with the telemetry data 312 are applied to the data-quality model 310 to generate a data-quality score 314. In certain examples, the computation data 320 is represented by respective statistical profiles and the second network data is provided to confirm (or disconfirm) trends and changes in the statistical profiles. Anomalous or bad data is more likely when deviations in the statistical profiles disagree with trends observed the second network data, suggesting that deviations are due to other causes than the operation and performance of the wireless network, such as due to malicious parties or erroneous measurements. When the second network data does not corroborate (or even contradicts) deviations in the statistical profiles, then the data-quality score would decrease, representing a lower confidence interval or reliability in the telemetry data and communicating to users of the telemetry data that they might not trust the current time period of the telemetry data.

For example, when the statistical profiles indicate a significant increase in co-channel interference, but the second network data does not show an increase in the number of clients (or UEs) and there is no increase in data traffic, then the increase in co-channel interference is likely due to anomalous or bad data. This is because the co-channel interference tends to be highly correlated with the number of clients and the amount of data traffic. Further, if the increase in co-channel interference occurs during off hours, then there is further evidence that the increase in co-channel interference is likely due to anomalous or bad data because increases in co-channel interference are unlikely to occur during off hours. This type of information (e.g., whether it is off hours, the number of clients, and the amount data traffic) might be part of the second network data. Although the second network data is not used in the RRM computations, the second network data can provide a sanity check on the computation data because the second network data can be correlated (or anti-correlated) with measurements and KPIs of the computation data 320.

In certain non-limiting examples, the data-quality score 314 is generated using one or more data models, which may use machine learning to provide a baseline. When the statistical profiles from the profiling layer 308 deviate significantly from these baselines, the deviations can indicate a degradation in the quality of the telemetry data 312. Further, when the computation data 320 tends to correlate with the second network data, such that change in the computation data 320 tend to accompany corresponding changes in the second network data, then machine learning models can learn these patterns and detect poor data quality based on deviations from the learned patterns. Machine-learning (ML) algorithms can be trained to recognize and respond to hidden patterns in data.

In certain non-limiting examples, the data-quality score 314 may be based on a machine-learning (ML) model. That is, when applying the data-quality model to generate the data-quality score 314, one or more ML models are used as data models that feed into generating the data-quality score 314. The ML models are trained using training data (e.g., labeled telemetry data that includes computation data 320 that is used in the RRM computations and second training data that is not used in the RRM computations). The training data is labeled with a score representing its quality. The score labeling the training data-quality score is referred to here as a "training data-quality score," and it is a function of time, like the data-quality score generated by the data-quality model 310. The ML model being trained by iteratively adjusting parameters of the ML model to generate an output that minimize a loss function representing a difference between the output and the training data-quality score.

In certain non-limiting examples, the data-quality score 314 may be based, at least in part, on detecting changes in the statistical profiles relative to a baseline statistical profile of the telemetry data and using the second network data to assess a likelihood that the detected changes arise from a degradation in a quality of the first network data.

In certain non-limiting examples, various algorithms can be used separately or in combination as data models to predict the data-quality score 314. For example, k-means clustering could be used determine how the data clusters when represented in a multi-dimensional space, establishing a baseline of clustering locations. Changes in the telemetry data resulting in the telemetry data 312 moving outside of the baseline of clustering locations can indicate a degradation in the quality of the telemetry data 312.

A similar analysis can be provided by using principal component analysis to determine a baseline for the principal dimensions of correlations for the telemetry data 312. Then potential degradations in the quality of the telemetry data 312 can be detected by monitoring changes in the principal components (e.g., directions or magnitudes).

Additionally or alternatively, the data-quality score 314 can be predicted using one or more clustering methods. For example, density-based spatial clustering of applications with noise (DBSCAN) can be used to perform statistical analysis on RRM KPIs to tag anomalous radios, group radios with similar characteristics, and to perform comparisons between good and bad APs and/or UEs. Additionally or alternatively, the data-quality score 314 can be predicted using one or more random forest classifiers or one or more gradient boosted trees methods. Other machine learning methods can also be used to predict the data-quality score 314.

In block 408, method 400 provides the data-quality score to an artificial intelligence (AI)-RRM engine (also referred to as the AI Core 108). The AI-RRM engine can use the data-quality score 314 when generating configuration recommendations for the wireless network. For example, the AI-RRM engine can set a data-quality threshold and omit from its calculations those portions of the computation data 320 during periods where the data-quality score 314 falls below the threshold. How aggressively the threshold is set could depend on the quantity of available data. If, there is a large quantity of data, a cost-benefit analysis would recommend setting a high threshold because the abundance of data indicates even if a significant part of the data is omitted, there will still be more than sufficient telemetry data 312 to perform the computations. Thus, there is little cost in discarding data that is only mildly suspected of being bad data.

In block 406 of method 400, the computation data 320 can optionally be filtered, according to a non-limiting example. In this optional example, the telemetry quality tracker 306 not only provides the data-quality score 314, but the telemetry quality tracker 306 also filters the computation data 320 using the data-quality score 314 and generates thereby filtered computation data 320. The filtered computation data 320 is then provided to the AI-RRM engine to be used for the RRM computations and other computations.

When block 406 is omitted and filtered computation data 320 is not provided to the AI Core 108, the AI Core 108 uses the data-quality score 314 to decide how to treat the computation data 320. In certain non-limiting examples, the AI Core 108 uses the data-quality score 314 to omit portions of the computation data 320 from computations performed by the AI Core 108. For example, the portions of the computation data 320 that are omitted from computation correspond to one or more periods during which the data-quality score 314 is below a predefined threshold.

In block 410, method 400 signals to a user that the portions of the computation data 320 were omitted from the computations performed by the AI Core 108.

In block 412 of method 400, the telemetry quality tracker 306 receives feedback 316 from the AI Core 108. For example, feedback 316 can be received at the statistical profiling layer 308 and at the data-quality model 310. The feedback 316 is optional and is omitted in certain examples of method 400.

In block 414, the feedback 316 from the AI Core 108 is used to generate the statistical profiles and/or to generate the data-quality score. For example, the feedback 31 feedback 316 can be used to perform reinforcement learning to further train the data-quality model 310.

In block 416 of method 400, the telemetry quality tracker 306 uses the statistical profiles together with the telemetry data 312 to predict one or more potential root causes of the poor data quality.

In block 418, method 400 controls a display to display an image that communicates the one or more potential root causes.

Figure 2:
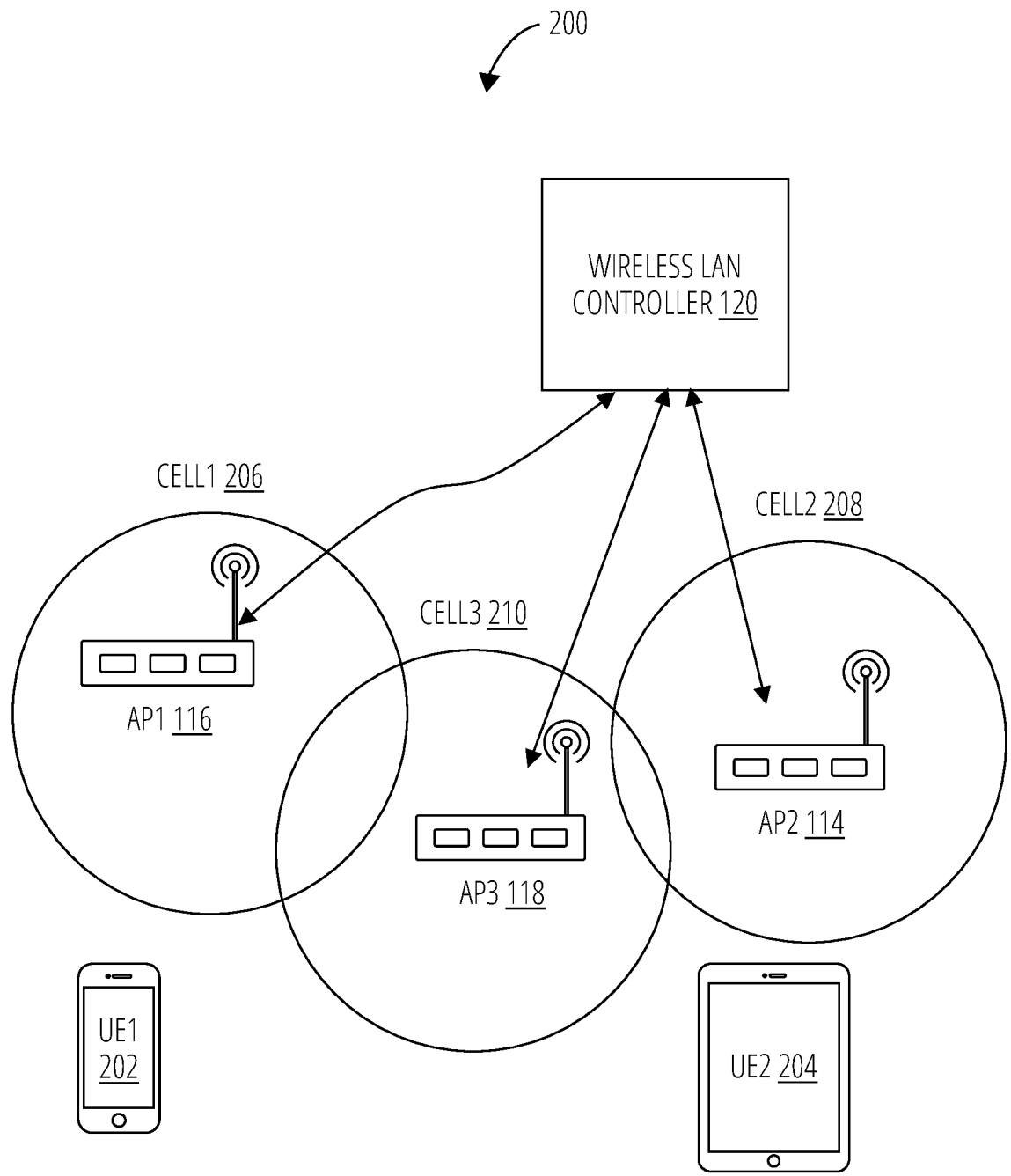
FIG. 2 illustrates a schematic diagram for an example of a wireless network within the system network, in accordance with some embodiments.
Figure 5:
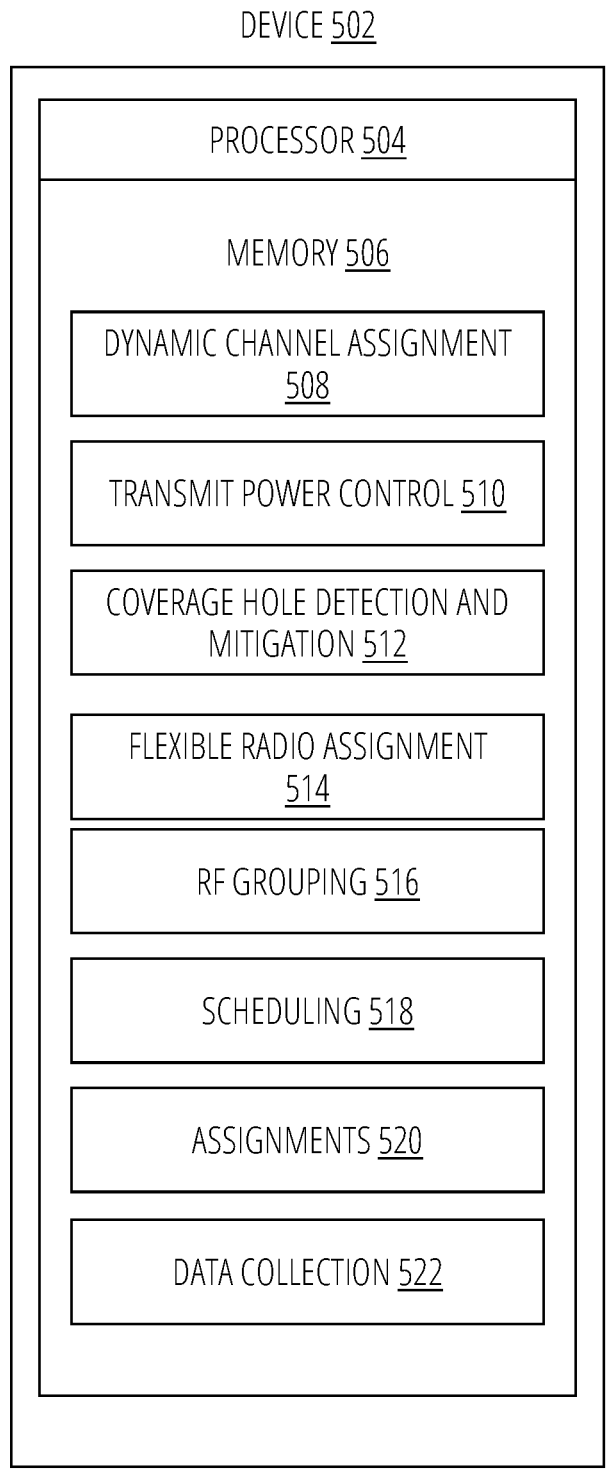
FIG. 5 illustrates a block diagram of an example of a device for computing radio resource management (RRM) values, in accordance with some embodiments.

RRM includes several algorithms, which together provide management of the wireless network 200. FIG. 5 illustrates a computing device 502 that performs various RRM steps/methods. Device 502 can be a performed using distributed computing. Some or all of the functions of device 502 can be performed by the WLCs, and some or all may be performed by the network controller 106 and/or the AI Core 108. In some embodiments, the device 502 can be an embodiment of the AI Core 108, illustrated in FIG. 2. In some embodiments, the functions attributed to device 502 might reside across the AI Core 108, network controller 106, and other devices illustrated in wireless network 200. The device 502 includes a processor 204 that performs the steps of the respective methods when executing the respective methods stored in the memory 506. The methods stored in the memory 506 can include, for example: (i) RF Grouping 516 (e.g., an algorithm responsible for determining the RF Group Leader and members); (ii) Flexible Radio Assignment (FRA) 514 (e.g., an algorithm charged with identifying redundant radios resources and re-assigning the resource to a better role); (iii) Dynamic Channel Assignment (DCA) 508 (e.g., a global algorithm that runs on the RF Group leader); (iv) Transmit Power Control (TPC) 210 (e.g., a global algorithm that runs on the RF Group Leader; and (v) Coverage Hole Detection and Mitigation (CHDM) 212 (e.g., a local algorithm that runs on each individual controller). The respective methods help to maintain optimal performance by optimally applying resources to balance various countervailing interest.

For example, increasing the transmit power in a cell (e.g., cell1 206 of an AP1 116) might help to overcome noise from the environment, but too much of an increase in the transmit power could cause interference with neighboring cells (e.g., cell3 210 of AP3 118), especially in regions where two or more cells overlap. If two cells overlap one another and the cells are on the same channel, then they share the spectrum, resulting in diminished communication capacity. Not only are users of each cell sharing the single channel of available spectrum, the management traffic also increases, which also takes up a part of the channel capacity. The result is higher consumption of air time and less throughput. This is commonly known as co-channel interference. Assuming that all wireless devices are operating on the same network, two aspects of the wireless network 200 can be controlled to mitigate co-channel interference. For example, to adjust any given cell in response to co-channel interference, the wireless network 200 can adjust the channel plan to facilitate the maximum separation of one AP from another AP on the same channel, and the wireless network 200 can adjust power levels to increase or decrease the size of the effective cells corresponding to respective APs. If more than two channels are available, neighboring cells can operate on different channels, thereby avoiding interference in overlapping regions between cells.

The use of RRM has several advantages including several features which manage specific traffic types or client types which can greatly increase the spectral efficiency and assist RRM in providing a better experience for users. The RRM can be organized according to a hierarchy with an RF Group Name at the top level, then RF Group leader(s) at the next level, which are then followed by RF Neighborhood(s) at the lower level, For any RF Group Name, multiple RF group Leaders may exist (e.g., one or more RF group Leaders frequencies in the 2.4 GHz band and one or more RF group Leaders frequencies in the 5 GHz band). An RF Group Leader can manage multiple RF Neighborhoods.

As used herein, the term "signal" refers to RF emanating from APs belonging to the same RF group or our APs. The term "interference" refers to signals (e.g., Wi-Fi signals) that interfere with a desired signal, such as signals do not belong to other networks (rogues). The term "noise" refers to any signal that cannot be demodulated according to the protocol of the wireless network 200 (e.g., any signal that is not an 802.11 signal). For example, noise can be from a non-802.11 source (such as a microwave or Bluetooth device) or from an 802.11 source whose signal is below sensitivity threshold of the receiver or has been corrupted due to collision or interference. The term "dBm" refers to an absolute, logarithmic mathematical representation of the strength of an RF signal (e.g., dBm directly correlates to milliwatts, but may also be used to represent output powers in the very low values common in wireless networking). The term "RSSI" or "Received Signal Strength Indicator" refers to an absolute, numeric measurement of the strength of the signal in a channel. The term "Noise floor" refers to the ambient RF Noise level (e.g., an absolute value expressed in dBm) below which received signals are unintelligible. The term "SNR" refers to a ratio of signal strength to noise floor, which is a relative value and as such is measured in decibels (dB). The term "RF Group" refers to the logical container that an instance of RRM is configured through. All devices belonging to a single RF Network will be configured as a member of a particular RF group. The term "RF Group leader" refers to the device where the algorithms for the RF group will be run. The RF group leader is either automatically selected through an election process or may be manually assigned through configuration. The term "RF Neighborhood" refers to a group of APs that belonging to the same RF group. For example, the RF Neighborhood can be a group of APs that can hear each other at ≥−80 dBm. This is a physical grouping based on RF proximity. The term "TPC" or "Transmit Power Control" refers to the RRM algorithm that monitors and manages transmit power level for all APs in the RF group. The term "DCA" or "Dynamic Channel Assignment" refers to the RRM algorithm responsible for selecting the operating channel for all APs in the RF group. The term "CHDM" or "Coverage Hole Detection and Mitigation" refers to the Coverage Hole Detection (CHD) algorithm and the Coverage Hole Mitigation (CHM) algorithm. The term "CM" or "Cost Metric" refers to an RSSI based metric which combines AP load, co-channel interference, adjacent channel interference, and non-WiFi sourced interference into a goodness metric, which can be used by the DCA method 508 to evaluate effective channel throughput potential. The term "COF" or "Coverage Overlap Factor" refers to an output of FRA algorithm. For example, the COF can represent a percentage of cells covered to −67 dBm by other 2.4 GHz radios. The term "FRA" or "Flexible radio Assignment" refers to an RRM algorithm that manages flexible radios and determines coverage redundancy and best roles for Flexible Radios to play based on coverage requirements and density.

The RF grouping 516 method is used as the basis for the administrative management domain and the physical management domain within the RF Network. Regarding the administrative domain, proper function of the RRM is based on knowing which APs and controllers are under administrative control for each part of the network. For example, the RF Group name can be an ascii string that all controllers and APs within the group will share. Regarding the physical RF domain, the RRM calculates channel plans and power settings based on an awareness of the RF Location of the APs within the network. For example, neighbor messaging can use the RF Group Name in a special broadcast message that allows the APs in the RF group to identify one another and to measure their RF Proximity. This information can then be used to form RF Neighborhoods within the RF Group (i.e., a group of APs that belong to the same RF Group that can physically hear one another's neighbor messages above −80 dBm, for example). Each RF Group has at least one RF Group Leader per band. The RF Group Leader can be the physical device responsible for: (i) configuration; (ii) running the active algorithms; and (iii) collecting and storing RF-group data and metrics.

In certain non-limiting examples, the Neighbor Discovery Protocol (NDP) is performed by sending an NDP packet from every AP/Radio/Channel every 60 seconds or less. The NDP packet is a special broadcast message that APs all listen for and it allows us to understand how every radio on every channel hears every other radio. It also gives us the actual RF path loss between APs. When an AP hears an NDP message, the AP validates whether the message is from a member of its RF Group. If the NDP message is valid. The AP forwards the message along with the received channel and RSSI to the controller. The forwarded message is added to the neighbor database, which in turn is forwarded to the RF group leader periodically. For each AP, each radio can store up to a predefined number of neighbors ordered by RSSI high to low. Post processing of this information can be used to generate measurements for RX Neighbors (e.g., how the given AP hears other APs) and TX Neighbors (e.g., how other APs hear the given AP).

Regarding the flexible radio assignment 514 method, the FRA uses the outputs from the Neighbor Discovery Protocol to locate each radio in RF distance and evaluate overlapping coverage by cell. Now, the flexible radio assignment 514 method is described according to certain non-limiting examples. First, using the NDP measurements from the APs, FRA plots the x and y coordinates relative to every other AP contained in the solution set (AP Group, physical neighbors). The circumference of each cell is calculated based on the present TX power level of each AP. This produces a logical matrix of the APs coverage intersections. Based on this understanding, FRA uses a multipoint analysis, to determine the percentage of overlapping coverage for each evaluated AP. The output of this calculation is the COF (Coverage Overlap Factor %). Coverage Overlap Factor is the percentage of the analyzed cell that is covered at −67 dBm or higher by other radios in service. In the process of calculating this coverage, the FRA method 514 keeps track of radios that are coverage contributors to other radios COF, and the FRA method 514 prevents those radios to be marked redundant as long as a radio they are a contributor for is marked redundant.

Once a Radio is marked redundant, the next step depends on the radio configuration. For example, there can be two (or more) operational states to which the flexible radio can be assigned: (i) FRA-auto or (ii) manual. When the radios in the "FRA Auto" state, FRA looks to DCA to decide what to do with the now redundant radio(s). DCA's priorities are, first, to try to assign the redundant radio in 5 GHZ and increase capacity, but, if the DCA determines that there is already maximum 5 GHz coverage, the radio will be assigned to a monitor role instead.

Regarding the dynamic channel assignments 508 method, the DCA monitors the available channels for the RF group and tracks the changing conditions. The DCA then optimize the RF separation between APs (minimizing co-channel interference) by selecting channels that are physically diverse, which maximizes RF efficiency. According to certain non-limiting examples, the DCA can monitor all available channels and develops the Cost Metric (CM) that will be used to evaluate various channel plan options. The CM can be an RSSI value comprised of interference, noise, a constant (user sensitivity threshold), and load (if enabled). The Cost Metric equates to a weighted SNIR (Signal to Noise Interference Ratio). The Group Leader can maintain the neighbor lists for all APs in the RF Group, and organizes these neighbors into RF Neighborhoods. The DCA can use the following metrics, which can be tracked for each AP in the RF Group: (i) same channel contention (e.g., other APs/clients on the same channel—also known as Co-Channel interference or CCI); (ii) foreign channel—rogue (e.g., other non RF Group APs operating on or overlapping with the APs served channel); (iii) noise (e.g., sources of interference such as Bluetooth, analog video, or cordless phones); (iv) channel load (e.g., through the use of industry standard QBSS measurements—these metrics are gathered from the Phy layer—very similar to CAC load measurements); and (v) DCA sensitivity (e.g., a sensitivity threshold selectable by the user that applies hysteresis to the evaluation on channel changes). The impact of each of these factors can be combined to form a single RSSI based metric known as the Cost Metric (CM). The CM then represents complex signal to noise and interference ration (SNIR) of a specific channel, which is used to evaluate the throughput potential of one channel over another. The goal is to be able to select the best channel for a given AP/Radio that minimizes interference.

The transmit power control 210 method balances the competing objectives of increasing SNR for the current AP while avoiding co-channel interference with neighboring APs. Since one of the major sources of interference in the network is the signals from other/neighboring APs, the transmit power control 210 method is important for optimal performance. That is, DCA and TPC work hand in hand to manage the RF environment. Transmit power largely determines our cell boundaries. The goal is to maximize the RF coverage in the environment without causing co-channel interference.

According to certain non-limiting examples, TPC uses the TX neighbor and RF Neighbor lists generated by the NDP method. RSSI organized lists built on how reception strength (Rx) from other APs (RX Neighbor) and transmit strength (Tx) to other APs (TX Neighbor), to form a picture of the communication strength among the respective APs within the RF Neighborhood and RF Group. Based on this information TPC sets the transmit power of each AP to maximize the coverage and minimize co-channel interference. TPC will adjust the Tx power up or down to meet the required coverage level indicated by the TPC Threshold. TPC runs on the RF Group leader and is a global algorithm that can be sub configured in RF profiles for groups of APs in an AP group.

Regarding the coverage hole detection and mitigation 512 method, the method can be used to achieve the following objectives: (i) detecting coverage holes, (ii) validating the coverage holes, and (iii) mitigating the coverage holes. That is, CHDM first detects coverage holes and then mitigates them (if possible without creating other problems) by increasing the transmit power and therefore cell area. According to certain non-limiting examples, CHDM can be a local algorithm that runs independent of RRM and the RF Group leader. To facilitate making decisions at a local level, CHDM can run on every controller. That is, each individual controller performs coverage hole detection monitoring all associated APs and thus monitoring every attached client and their received signal levels. Mitigation involves increasing the power on an AP, or group of APs to improve coverage levels to a certain area where client signals fall below a customer selectable threshold.

According to certain non-limiting examples, coverage hole detection can be based on a 5 second (CHD measurement period) histogram of each Clients Received RSSI values maintained by the AP. Values between −90 dBm and −60 dBm are collected in a histogram in 1 dB increments. A client falling below the configured RSSI thresholds for 5 seconds can be marked, e.g., as a pre-coverage hole event.

According to certain non-limiting examples, coverage hole mitigation is a process preformed once the decision to mitigate is made. If a coverage hole exists and it meets certain criteria for mitigation (e.g., a minimum number of clients and a minimum percentage), the AP will increase power by one step. CHDM will then continue to run, and if additional mitigation is called for will re-qualify and power will again be increased by 1 step. This incremental approach can prevent wild and unstable swings in power.

Coverage hole mitigation, while operating independent of RRM's DCA and TPC, can have a significant effect on surrounding APs and the balance of the RF in an environment. Part of the decision to mitigate is based on an evaluation of whether the mitigation could be successful. Increasing the power of a given AP independently of the RF Group metrics is likely to negatively impacting surrounding APs. So mitigation can be applied judiciously. The combination of the new detection metrics and the power limits included in mitigation are applied to make CHDM a stable algorithm.

In addition to the above methods, the memory 506 of the device 502 can also store information for scheduling 518, assignments 520, and information for data collection 522. The data collection 522 can include several types of measurements.

With respect to data collection 522, the RRM processes collected data, which is then used in the organization of RRM as well as for processing channel and power selections for the connected APs. Now, a discussion is provided for how and where to configure monitoring tasks, and how the collected data relates to an operational environment.

Channel scanning, such as passive channel scanning, can be performed on all channels supported by the selected radio. Additionally or alternatively, channel scanning can be performed on a set of channels (i.e., the channel set) defined by the DCA method, which can includes all of the non-overlapping channels. The channel set can be modified in accordance with user inputs, for example. Additionally a passive dwell lasting a predefined duration (e.g., 50 msec.) can be used to detect Rogues, and collect noise and interference metrics. Also, a Neighbor Discovery Protocol Transmission (TX) can be used to send the NDP message from all channels defined to be part of a monitor set.

Figure 6A:
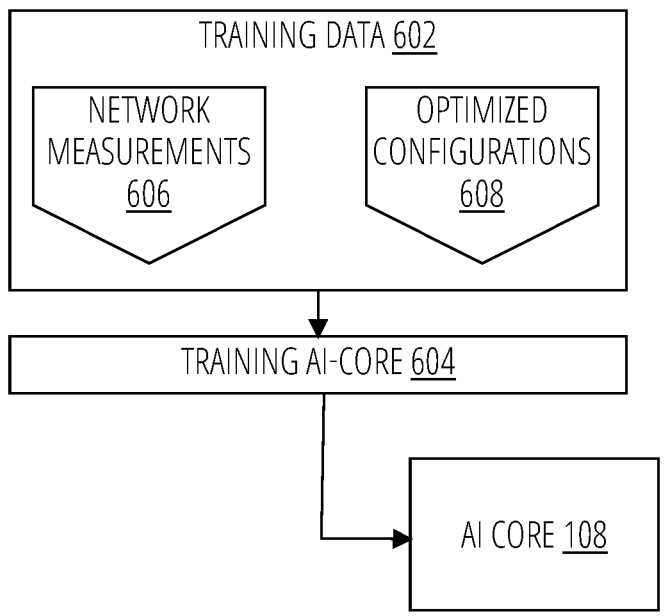
FIG. 6A illustrates a flow diagram of an example of training an artificial intelligence (AI) core, in accordance with some embodiments.

FIG. 6A illustrates an example of training the AI Core 108. In block 604, training data 602 is applied to training the AI Core 108. For example, the AI Core 108 can be an artificial neural network (ANN) that is trained via supervised learning using a backpropagation technique to train the weighting parameters between nodes within respective layers of the ANN. In supervised learning, a set of training data 602 is obtained, and the network is iteratively updated to reduce an error/loss function. The value of the error/loss function decreases as the AI Core 108 outputs configurations that increasingly approximate the optimized configurations 608. In other words, ANN infers the mapping implied by the training data, and the error/loss function produces an error value related to the mismatch between the optimized configurations 608 and the output from the AI Core 108 that is produced by applying the network measurements 606 to the AI Core 108. For example, in certain implementations, the cost function can use the mean-squared error to minimize the average squared error. In the case of a of multilayer perceptrons (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribiére update, Powell-Beale restart, and scaled conjugate gradient). Additionally, evolutionary methods, such as gene expression programming, simulated annealing, expectation-maximization, non-parametric methods and particle swarm optimization, can also be used for training the AI Core 108.

The training 604 of the AI Core 108 can also include various techniques to prevent overfitting to the training data 602 and for validating the trained AI Core 108. For example, boot strapping and random sampling of the training data 602 can be used during training.

In addition to supervised learning used to initially train the AI Core 108, the AI Core 108 can be continuously trained while being used by using reinforcement learning based on the network measurements and the corresponding configurations used on the network. The AI Core 108 can be cloud based and can be trained using network measurements and the corresponding configurations from other networks that provide feedback to the cloud.

Further, other machine learning (ML) algorithms can be used for the AI Core 108, and the AI Core 108 is not limited to being an ANN. For example, there are many machine-learning models, and the AI Core 108 can be based on machine learning systems that include generative adversarial networks (GANs) that are trained, for example, using pairs of network measurements and their corresponding optimized configurations.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 6B:
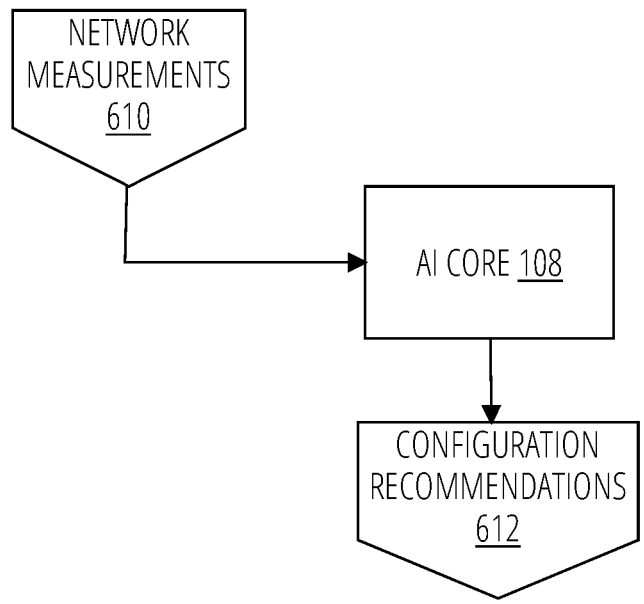
FIG. 6B illustrates a flow diagram of an example of using the AI core, in accordance with some embodiments.

FIG. 6B illustrates an example of using the trained AI Core 108. The actual network measurements are applied to the trained AI Core 108, which then generated configuration recommendations 612. The configuration recommendations will then be provided to a network controller 106, which selectively applies the configuration recommendations in accordance with settings therein. For example the configuration recommendations can be applied a predefined times for certain portions of the wireless network 200. For example, certain configuration recommendations might only be applied when there is a radio reset. Other configuration recommendations might be applied only when there is minimal risk of disrupting service during business hours. Further, different regions within the wireless network 200 might be scheduled differently.

Figure 7:
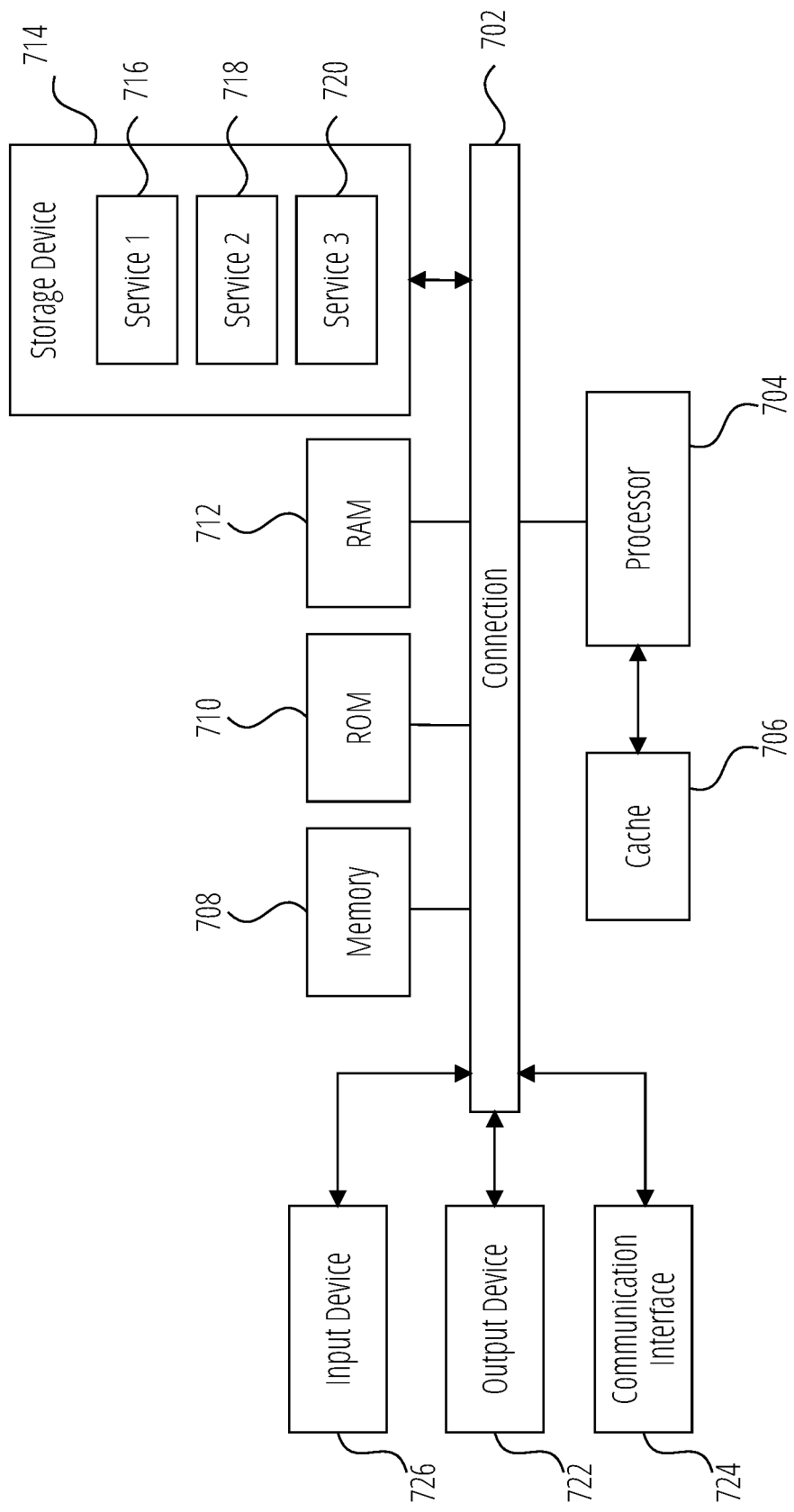
FIG. 7 illustrates a block diagram of an example of a computing device, in accordance with some embodiments.

FIG. 7 shows an example of computing system 700, which can be for example any computing device making up the AI Core 108, the network controller 106, the wireless LAN controller 120, the telemetry quality tracker 306, or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 704 and connection 702 that couples various system components including system memory 708, such as read-only memory (ROM) 710 and random access memory (RAM) 712 to processor 704. Computing system 700 can include a cache of high-speed memory 706 connected directly with, in close proximity to, or integrated as part of processor 704.

Processor 704 can include any general purpose processor and a hardware service or software service, such as services 716, 718, and 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 724, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., that when the code that defines such software is executed by the processor 704, it causes the system to perform a function. In some embodiments, a hardware service that performs a particular function can include the software component stored in a computer-readable medium in connection with the necessary hardware components, such as processor 704, connection 702, output device 722, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a network devices and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards.

Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of monitoring quality of telemetry data from a wireless network, the method comprising:
   processing, by a statistical profiling layer, telemetry data from a wireless network and generating therefrom statistical profiles of the telemetry data, wherein the telemetry data includes first network data that is used in radio resource management (RRM) computations and second network data that is not used in the RRM computations;
   applying the statistical profiles together with the second network data to a data-quality model that generates a data-quality score, which is a function of time, the data-quality score representing an assessment of quality for the first network data, and
   providing the data-quality score to an RRM calculator that uses the data-quality score when performing RRM computations based on the first network data.

2. The method of claim 1, wherein the RRM calculator is an artificial intelligence (AI)-RRM engine that is based in a cloud and uses the telemetry data to generate configuration recommendations for the wireless network.

3. The method of claim 1, wherein the data-quality score is based, at least in part, on detecting changes in the statistical profiles relative to a baseline statistical profile of the telemetry data and using the second network data to assess a likelihood that the detected changes arise from a degradation in a quality of the first network data.

4. The method of claim 1, wherein
   the data-quality model that generates the data-quality score is a machine-learning (ML) model that has been trained using training data comprising labeled telemetry data, and
   the labeled telemetry data comprises a label, first training data, and second training data, the first training data being telemetry data that is used in the RRM computations, the second training data being telemetry data that is not used in the RRM computations, and the label being a training data-quality score corresponding to quality of the first training data as a function of time, wherein
   the ML model is trained by iteratively adjusting parameters of the ML model to generate an output that minimize a loss function representing a difference between the training data-quality score and an output of the ML model generated in response to applying the first training data and the second training data as inputs to the ML model.

5. The method of claim 1, further comprising:
   when the data-quality score falls below a predefined threshold, signaling that the data quality is poor; and
   processing the statistical profiles together with the second network data to predict one or more potential root causes of the poor data quality.

6. The method of claim 5, further comprising:
   signaling, to a user, the one or more potential root causes of the poor data quality by controlling a display to display an image that communicates the one or more potential root causes.

7. The method of claim 1, wherein the statistical profiles represents statistical distributions of key performance indicators (KPI) of the first network data, and the data-quality score is based, at least in part, on an analysis of correlations between the KPIs and the second network data, such that the data-quality score remains high when the correlations remain within a baseline range, but the data-quality score decrease as the correlations move farther away from the baseline range.

8. The method of claim 1, wherein the statistical profiles represents statistical distributions of key performance indicators (KPI) of the first network data, and the data-quality score is based, at least in part, on a baseline range determined for the statistical distributions of the KPIs, such that the data-quality score remains high when the statistical profiles remain within the baseline range, but the data-quality score decrease as the statistical profiles deviate farther away from the baseline range.

9. The method of claim 1, wherein the statistical profiles represent statistical distributions of key performance indicators (KPI) derived from the first network data, and the data-quality score is based, at least in part, on a degree to which the statistical distributions of the KPIs agree with baseline properties that have been determined for the statistical distributions of the KPIs.

10. The method of claim 1, further comprising:
    filtering or correcting the first network data using the data-quality score to generate filtered or corrected first network data; and
    providing the filtered or corrected first network data to the RRM calculator.

11. The method of claim 1, further comprising:
    weighting the first network data using the data-quality score to generate weighted first network data; and
    providing the weighted first network data to the RRM calculator.

12. The method of claim 1, further comprising:
    omitting portions of the first network data from computations performed by the RRM calculator, wherein the portions of the first network data that are omitted from computation correspond to one or more periods during which the data-quality score is below a predefined threshold; and
    signaling to a user that the portions of the first network data were omitted from the computations performed by the RRM calculator.

13. The method of claim 1, wherein the data-quality score decreases when changes in the statistical profiles correlate or coincide with events in the second network data indicating a likelihood that the changes in the statistical profiles arise from a condition other than a change in a performance of the wireless network.

14. The method of claim 1, further comprising:
receiving, at the statistical profiling layer and at the data-quality model, feedback from the RRM calculator; and
using the feedback from the RRM calculator when generating the statistical profiles and generating the data-quality score.

15. The method of claim 14, wherein the feedback from the RRM calculator is used to perform reinforcement learning on the data-quality model, the feedback from the AI-RRM engine providing an indication of which time windows of the telemetry data resulted in the RRM computations that improved a performance of the wireless network and which time windows of the telemetry data resulted in the RRM computations that degraded the performance of the wireless network.

16. A computing apparatus comprising:
a processor; and
a memory storing instructions that, when executed by the processor, configure the apparatus to:
process, by a statistical profiling layer, telemetry data from a wireless network and generating therefrom statistical profiles of the telemetry data, wherein the telemetry data includes first network data that is used in radio resource management (RRM) computations and second network data that is not used in the RRM computations;
apply the statistical profiles together with the second network data to a data-quality model that generates a data-quality score, which is a function of time, the data-quality score representing an assessment of quality for the first network data; and
provide the data-quality score to an RRM calculator that uses the data-quality score when performing RRM computations based on the first network data.

17. The computing apparatus of claim 16, wherein, when executed by the processor, instructions stored in the memory cause the processor to send feedback from the RRM calculator to the data-quality model, and the feedback from the RRM calculator is used to perform reinforcement learning on the data-quality model, wherein the feedback from the RRM calculator provides an indication of which time windows of the telemetry data resulted in the RRM computations that improved a performance of the wireless network and which time windows of the telemetry data resulted in the RRM computations that degraded the performance of the wireless network.

18. The computing apparatus of claim 16, wherein
the data-quality model that generates the data-quality score is a machine-learning (ML) model that has been trained using training data comprising labeled telemetry data, and
the labeled telemetry data comprises a label, first training data, and first training data, the second training data being telemetry data that is used in the RRM computations, the second training data being telemetry data that is not used in the RRM computations, and the label being a training data-quality score corresponding to quality of the first training data as a function of time, wherein
the ML model is trained by iteratively adjusting parameters of the ML model to generate an output that minimize a loss function representing a difference between the training data-quality score and an output of the ML model generated in response to applying the first training data and the second training data as inputs to the ML model.

19. The computing apparatus of claim 16, wherein, when executed by the processor, instructions stored in the memory cause the processor to generate the data-quality score such that the data-quality score is based, at least in part, on detecting changes in the statistical profiles relative to a baseline statistical profile of the telemetry data and using the second network data to assess a likelihood that the detected changes arise from a degradation in a quality of the first network data.

20. A non-transitory computer-readable storage medium, the computer-readable storage medium including instructions that when executed by a computer, cause the computer to:
process, by a statistical profiling layer, telemetry data from a wireless network and generating therefrom statistical profiles of the telemetry data, wherein the telemetry data includes first network data that is used in radio resource management (RRM) computations and second network data that is not used in the RRM computations;
apply the statistical profiles together with the second network data to a data-quality model that generates a data-quality score, which is a function of time, the data-quality score representing an assessment of quality for the first network data; and
provide the data-quality score to an RRM calculator that uses the data-quality score when performing RRM computations based on the first network data.

* * * * *